(12) United States Patent
Kitamura

(10) Patent No.: US 7,719,723 B2
(45) Date of Patent: May 18, 2010

(54) EXPOSED IMAGE INPUT DEVICE, PRINTER APPARATUS, AND IMAGE DATA INPUT CONTROL PROGRAM PRODUCT

(75) Inventor: Tetsuro Kitamura, Osaka (JP)

(73) Assignee: Kyocera Mita Corporation (JP)

( * ) Notice: Subject to any disclaimer, the term of this patent is extended or adjusted under 35 U.S.C. 154(b) by 855 days.

(21) Appl. No.: 11/598,879

(22) Filed: Nov. 14, 2006

(65) Prior Publication Data

US 2007/0109572 A1     May 17, 2007

(30) Foreign Application Priority Data

Nov. 16, 2005     (JP)     ............................. 2005-331461

(51) Int. Cl.
H04N 1/40     (2006.01)
H04N 1/38     (2006.01)
(52) U.S. Cl. ...................................... 358/3.23; 358/463
(58) Field of Classification Search .............. 358/3.23, 358/3.26, 1.16, 1.17, 530, 537, 447, 448, 358/452, 463, 471, 474; 382/254, 289, 309
See application file for complete search history.

(56) References Cited

U.S. PATENT DOCUMENTS

2006/0226338 A1*  10/2006  Tojima et al. ............ 250/208.1
2006/0290767 A1*  12/2006  Tezuka et al. ............... 347/115
2007/0206978 A1*   9/2007  Yamada et al. .............. 399/301
2007/0282528 A1*  12/2007  Morgan et al. .............. 701/214

FOREIGN PATENT DOCUMENTS

JP     2004082396     3/2004

* cited by examiner

Primary Examiner—Jerome Grant, II
(74) Attorney, Agent, or Firm—Gerald E. Hespos; Michael J. Porco

(57) ABSTRACT

To print on the front side, image data saved in an image memory is read pixel by pixel along a main scanning direction x. Correction data for each block of pixels then is referred to, and the image data is read while being shifted in a sub-scanning direction y by a value of the correction data and is inputted to an exposing device. To print on the rear side, upon reading image data along the main scanning direction x, the image data in the image memory is read along the main scanning direction from a side opposite the one read at the time of printing on the front side. Positive and negative signs of deviation amounts specified by the correction data are reversed and the positions of the pixels to be read are shifted successively in a sub-scanning direction opposite to the one used while printing on the front side.

10 Claims, 7 Drawing Sheets

EXPOSED IMAGE INPUT DEVICE, PRINTER APPARATUS, AND IMAGE DATA INPUT CONTROL PROGRAM PRODUCT

BACKGROUND OF THE INVENTION

1. Field of the Invention

The present invention relates to an exposed image input device, a printer apparatus and an image data input control program product and particularly to a technology of reading an image data saved in an image memory and inputting the read image data to an exposing device.

2. Description of the Related Art

Among electrophotographic printer apparatuses, there has been conventionally known the type in which an exposing device arranged to face a photoconductive drum includes a LED (light-emitting diode) array and the photoconductive drum is exposed with lines of light emitted from the LED array. Printer apparatuses of this type are called LED printers. The LED printer has a problem that lines of light emitted from the LED array, i.e. exposure lines are deviated from specified positions in some cases. The following three factors are known as causes of the deviated exposure lines.

The first factor is an angular error caused upon mounting the LED array on the printer apparatus. It is not easy to strictly conform a direction of a principal axis of the LED array to a main scanning direction and it is a usual practice to install the LED array in a transversely inclined state with respect to the main scanning direction.

The second factor is a deviation caused upon mounting LED chips forming the LED array on a substrate. It is ideal to linearly arrange the LED chips along the principal axis of the LED array. However, due to variations in a production process, there are cases where the LED chips are deviated from linearity to a certain degree.

The third factor is deviations of the respective LED chips from the main scanning direction caused by the distortion of the substrate, on which the LED chips forming the LED array are mounted, from linearity. It is not easy to ensure the strict linearity of the substrate while saving the production cost.

Conventional LED printers have ensured printing quality by compensating for mounting deviations by transferring image data to the LED array while displacing them in a sub-scanning direction according to the deviations of the respective LED chips. However, for duplex printing in the LED printer, it is necessary to temporarily save image data in the image memory alternately in forward order and reverse order page by page.

Japanese Unexamined Patent Publication No. 2004-82396 discloses an exposing device enabling duplex printing without alternately changing the order of transferring image data to an LED array in forward and reverse ones page by page. However, with a technology disclosed in this publication, it is not possible to realize duplex printing while correcting the deviations of LED chips.

SUMMARY OF THE INVENTION

In view of the problems residing in the prior art, an object of the present invention is to enable duplex printing while correcting deviations of exposure lines by an exposing device without saving image data to be printed on the rear side by reversing it.

The present invention is directed to an exposed image input device for reading an image data saved in an image memory and inputting the read image data to an exposing device, comprising: a correction data memory for storing a correction data specifying a deviation amount of the image data in a sub-scanning direction for each position along a main scanning direction; a first reading section for inputting an image data of one page to the exposing device while reading the image data pixel by pixel in a specified order from the image memory by referring to the correction data; a second reading section for inputting an image data of one page to the exposing device while reading the image data pixel by pixel in an order opposite to the specified order from the image memory by referring to the correction data; and a switching section for alternately switching the first and second reading sections to operate and alternately causing the first and second reading sections to read the image data of one page every time the image data of one page saved in the image memory is read, the specified order being an order in which the image data is read along the main scanning direction while shifting the positions of pixels to be read in the sub-scanning direction pixel by pixel by the deviation amounts specified by the correction data and the readout along the main scanning direction is repeated while successively moving the readout positions in the sub-scanning direction.

According to this device, an operation of reading the image data saved in the image memory in the specified order for the respective positions along the main scanning direction and inputting it to the exposing device and an operation of reading the image data saved in the image memory in the order opposite to the specified order and inputting it to the exposing device are alternately switched every time the image data of one page is read. Thus, by applying this device to a printer capable of performing duplex printing by turning a recording sheet by 180° between printing on front side and printing on the rear side, duplex printing can be achieved without saving the image data for printing on the rear side in the image memory by reversing it.

Further, since the image data is read pixel by pixel while the readout positions are shifted in the sub-scanning direction with respect to the main scanning direction based on the correction data stored in the correction data memory, even if there is a deviation of the exposure line by the exposing device due to an installation error or the like, proper printing can be achieved by correcting this deviation for both printing on the front side and printing on the rear side.

DETAILED DESCRIPTION OF THE PREFERRED EMBODIMENTS

Figure 1:
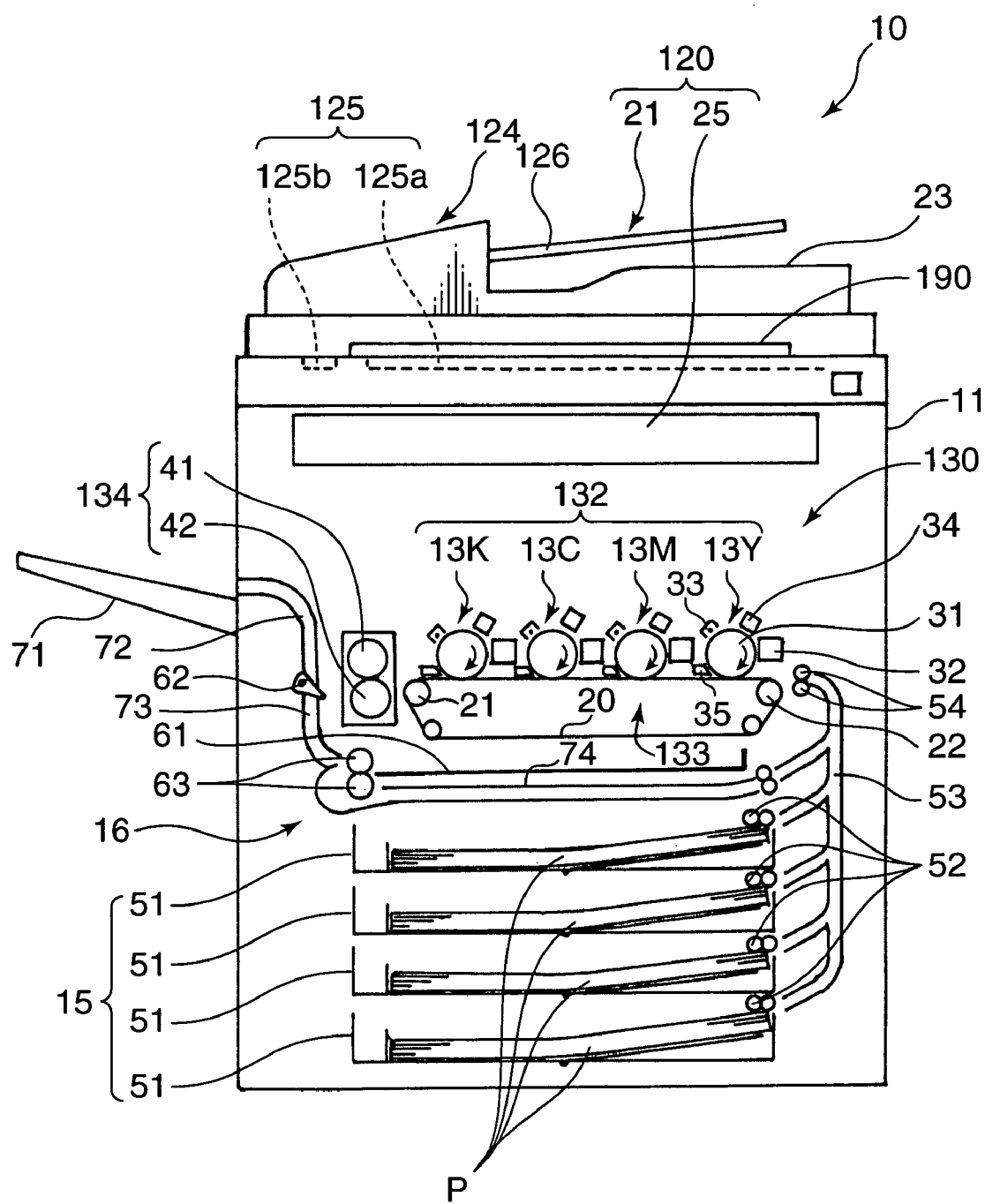
FIG. 1 is a front view in section mainly showing the mechanical construction of an image forming apparatus according to one embodiment of the invention.

FIG. 1 is a front view in section mainly showing the mechanical construction of an image forming apparatus 10 according to one embodiment of the present invention. The image forming apparatus 10 has a built-in tandem color printer and includes an apparatus main body 11 box-shaped as shown in FIG. 1. A scanner device 120 for reading an image of a document and an operation panel 190 used to input various conditions for an image forming process are arranged atop the apparatus main body 11. A recording assembly 130 for recording an image on a recording sheet P based on an image data read from a document by the scanner device 120 is arranged at a position below the scanner device 120 in the apparatus main body 11. The recording assembly 130 includes an image forming section 132 for forming toner images on photoconductive drums 31 as image bearing members based on the image data, a transferring section 133 for transferring the toner image formed by the image forming section 132 to the recording sheet P, a fixing section 134 for fixing the image transferred to the recording sheet P and a sheet storing section 15 for storing recording sheets P, to which images are to be transferred.

The scanner device 120 includes a document pressing portion 21 that can be opened and closed, and an optical unit 25 opposed to the document pressing portion 21 in the apparatus main body 11 with a contact glass 125 therebetween. The contact glass 125 is comprised of a contact glass 125a having a planar shape slightly smaller than that of the document pressing portion 21 and adapted to read a document surface of a document placed thereon and a contact glass 125b narrow and long in forward and backward directions in FIG. 1 and adapted to read a document surface of an automatically fed document.

The document pressing portion 21 has a two-stage structure and includes a document tray 126 arranged at the upper stage to have documents placed thereon and a document discharge tray 23 arranged at the lower stage to have document having the images thereof read discharged thereon. A document feeder 124 is provided between the document tray 126 and the document discharge tray 23 at the left side of the document pressing portion 21 in FIG. 1. Documents placed on the document tray 126 are picked up and fed to the contact glass 125b for automatic feeding one by one by an unillustrated document feeding mechanism provided in this document feeder 124, and have the document surfaces thereof read by the optical unit 25 via the contact glass 125b for automatic feeding while being moved.

The optical unit 25 includes an exposure lamp 121 (see FIG. 4) as a light source, a plurality of mirrors, a lens unit and a CCD (charge coupled device) 122 (see FIG. 4) as a light receiving element. A light from the light source is reflected at the document surface and this reflected light is inputted to the CCD 122 as an image data via these mirrors and the lens unit. The image data as an analog quantity inputted to the CCD 122 is converted into a digital data, which is saved in an image memory 140 after various image processings are applied to improve image quality in an image processing section 160 (see FIG. 4).

The image memory 140 preferably includes a RAM (random access memory) to enable the reading and writing of image data at high speed. A memory storage of the image memory 140 may be of such a size capable of storing all the image data of a plurality of pages created as data to be printed as one print job or one copy job is executed or may be of such a size necessary to store an image data of one page every time one page is printed.

The image forming section 132 includes a yellow unit 13Y, a magenta unit 13M, a cyan unit 13C and a black unit 13K successively arranged in this order from an upstream side (right side in FIG. 1) to a downstream side of the recording sheet P fed from the sheet storing section 15. Each of the units 13Y, 13M, 13C and 13K has a developing device 32 in addition to the photoconductive drum 31. Each photoconductive drum 31 receives toner supplied from the corresponding developing device 32 while rotating in clockwise direction in FIG. 1.

A charger 33 is disposed at an upper left position from each photoconductive drum 31 in FIG. 1 and an exposing device 34 is disposed at an upper right position from each photoconductive drum 31 in FIG. 1. Each photoconductive drum 31 has the outer circumferential surface thereof uniformly charged by the corresponding charger 33, and this charged circumferential surface is irradiated by the exposing device 34 with a light emitted based on the image data saved in the image memory 140 (see FIG. 4) to form an electrostatic latent image thereon.

Figure 2:
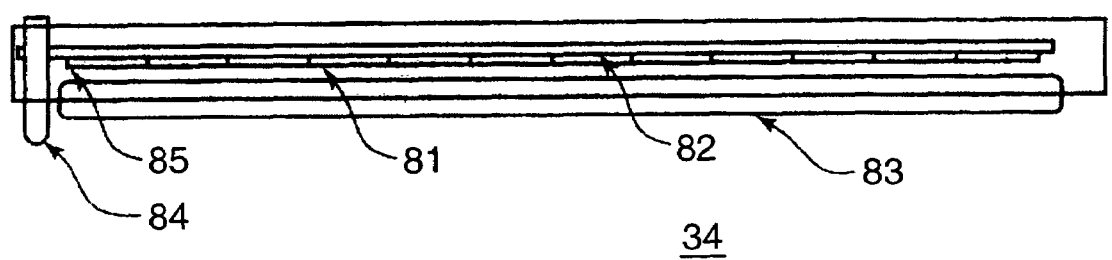
FIG. 2 is a schematic diagram showing the outer configuration of an exposing device of FIG. 1.

FIG. 2 is a schematic diagram showing the outer configuration of each exposing device 34. An LED array 81 is such that LED devices as light emitting elements are arrayed, for example, at even intervals (e.g. intervals of 42.3 μm in the case where the sheet has an A4 size and resolution is 600 dpi) in a row on a printed board 82. For example, 5120 LED devices are arrayed in a main scanning direction. Here, the main scanning direction is an arranged direction of the LED array 81 of the exposing device 34 and is perpendicular to a feeding direction of the recording sheet P. On the contrary, an sub-scanning direction is a direction which is perpendicular to the main scanning direction and in which the LED array 81 is moved relative to the recording sheet P. The respective LED devices correspond to dots for forming an image. Selfoc lenses (registered trademark of Nippon Glass, Co) 83 are arrayed, for example, in two rows at even intervals on light paths of the LED devices. The Selfoc lenses 83 are cylindrical lenses arrayed to focus the lights from the LED devices. A reference pin 84 is for determining a position when the exposing device 34 is fixed to each of the units 13Y, 13M, 13C, 13K of the image forming section 132. Thus, the exposing device 34 can be fixed at a correct position.

Referring back to FIG. 1, a toner image is formed on the outer circumferential surface of the photoconductive drum 31 by supplying toner to an electrostatic latent image from the developing device 32. A cleaning device 35 for cleaning the outer circumferential surface of the photoconductive drum 31 by removing the residual toner is disposed at a lower left position from each photoconductive drum 31 in FIG. 1. The outer circumferential surface of the photoconductive drum 31 cleaned by the cleaning device 35 is moved toward the charger 33 to be charged anew.

A transfer/conveyance belt 20 is disposed below the respective photoconductive drums 31 such that a conveyance surface thereof faces the respective photoconductive drums 31. This transfer/conveyance belt 20 is mounted on a drive roller 21 disposed slightly downstream of the black unit 13K and a driven roller 22 disposed slightly upstream of the yellow unit 13Y, and is turned in counterclockwise direction in FIG. 1 by the driving rotation of the drive roller 21. The recording sheet P fed from the sheet storing section 15 is moved while touching the outer circumferential surfaces of the respective photoconductive drums 31 by being guided by the turning movement of this transfer/conveyance belt 20, whereby an image transferring operation is carried out.

A pressing roller (not shown) whose outer circumferential surface is opposed to that of the driven roller 22 is disposed above the driven roller 22, and the recording sheet P fed from a pair of registration rollers 54 to be described later is guided by the outer circumferential surface of this pressing roller to be fed onto the transfer/conveyance belt 20.

The fixing section 134 is for fixing the toner image transferred onto the recording sheet P in the image forming section 132 and includes a heating roller 41 and a pressure roller 42 vertically opposed to each other. The recording sheet P finished with the image transferring operation and coming out of the image forming section 132 by the turning movement of the transfer/conveyance belt 20 is nipped between the heating roller 41 and the pressure roller 42 while being heated, whereby the toner image is fixed by a heating process. As a result, a stable color image is formed on the recording sheet P. The recording sheet P bearing the color image after the image fixing operation is discharged onto a discharge tray 71 projecting from the left wall of the apparatus main body 11 through a discharging conveyance path 72.

The sheet storing section 15 includes sheet trays arranged at a plurality of stages and detachably mounted into the apparatus main body 11. A stack of recording sheets P are stored in each sheet tray 51. The recording sheets P are dispensed one by one from the sheet stack in the selected sheet tray 51 by driving a pickup roller 52, and are introduced to the image forming section 132 via a feeding conveyance path 53. The pair of registration rollers 54 facing an upstream end of the transfer/conveyance belt 20 are disposed at a downstream end of the feeding conveyance path 53, and the recording sheet P is stably fed to the transfer/conveyance belt 20 by being nipped between the pair of registration rollers 54.

Further, a sheet reversing section 16 used to apply duplex printing to the recording sheet P is disposed in the apparatus main body 11. This sheet reversing section 16 is provided with an intermediate tray 61 disposed between the image forming section 132 and the sheet storing section 15 for temporarily storing the recording sheet P having the image fixed to one side thereof, a switching guide 62 disposed at a position immediately downstream of the fixing section 134 for switching the sheet P after the image fixing operation to either one of the discharging conveyance path 72 and a returning conveyance path 73, and a pair of reversing rollers 63 for dispensing the recording sheet P temporarily stored in the intermediate tray 61 with the trailing end of the recording sheet P facing forward.

Figure 3:
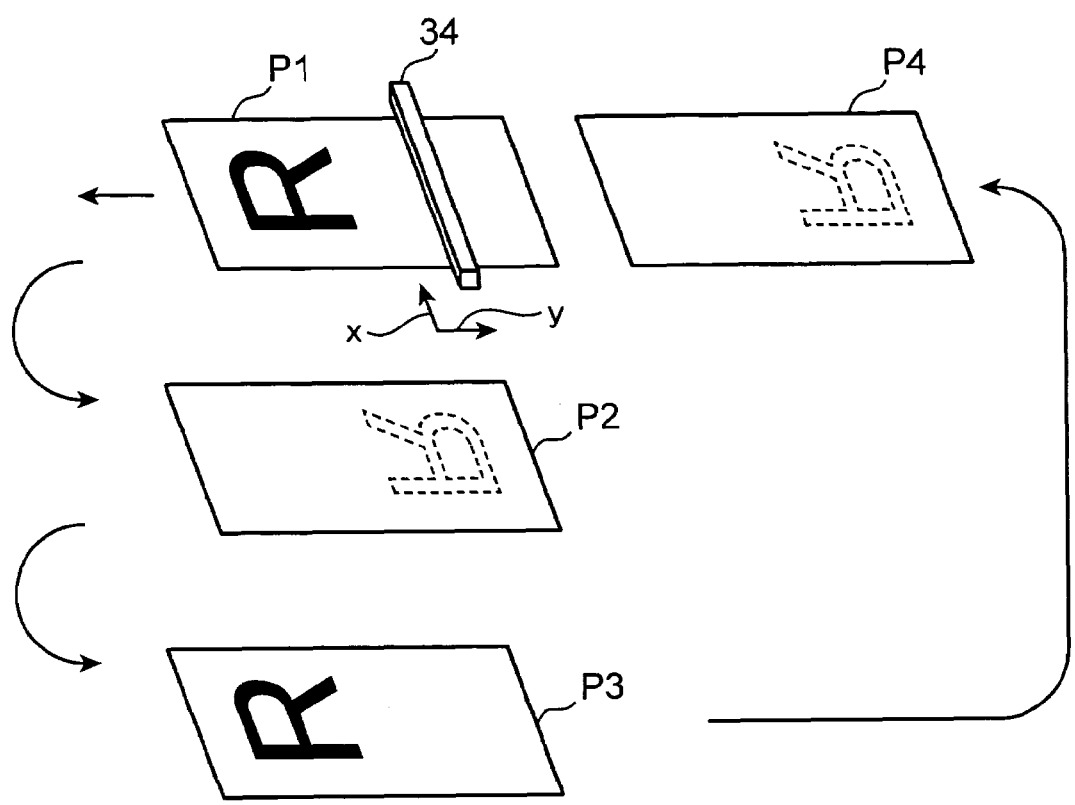
FIG. 3 is a diagram showing the operation of the apparatus of FIG. 1, particularly the conveyance of a recording sheet for duplex printing.

A user can select either one of duplex printing and usual simplex printing by operating the operation panel 190. If the users select duplex printing, a recording sheet P first has an image transferred to the front side thereof while being conveyed by the transfer/conveyance belt 20 as schematically shown in FIG. 3. The recording sheet P in this state is shown by P1. A main scanning direction x and a sub-scanning direction y are also shown in FIG. 3. In FIG. 3, the exposing device 34 is shown to directly face the recording sheet P without showing the photoconductive drum 31 between the exposing device 34 and the recording sheet P1.

The recording sheet P1 is temporarily stored in the intermediate tray 61 via the returning conveyance path 73 and the pair of reversing rollers 63 by a switching operation of the switching guide 62 after the image transferring operation. The recording sheet P in this state is shown by P2. The recording sheet P2 is turned front-side back and upside down with respect to the recording sheet P1. Subsequently, the recording sheet P2 is discharged from the intermediate tray 61 with the trailing end thereof facing forward through the reverse rotation of the pair of reversing rollers 63 to be fed to the reversing conveyance path 74. The recording sheet P in this state is shown by P3. The recording sheet P3 is further conveyed to the feeding conveyance path 53. Thereafter, the recording sheet P3 conveyed to the feeding conveyance path 53 and turned front-side back and upside down with respect to the recording sheet P1 moves onto the transfer/conveyance belt 20 with the training end facing forward, whereby an image is transferred to the rear side of the recording sheet P. In this way, duplex printing to the recording sheet P can be realized.

Figure 4:
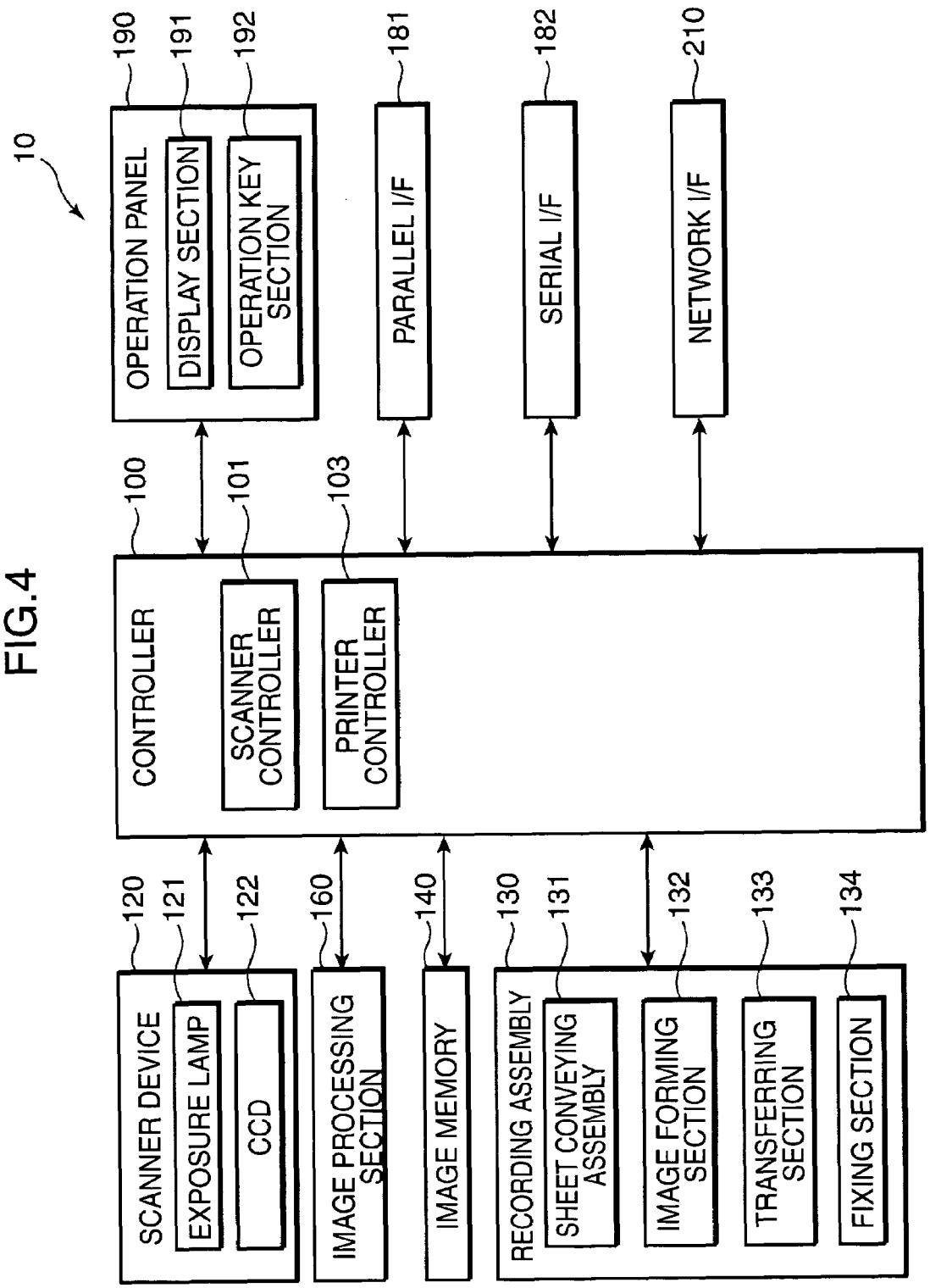
FIG. 4 is a block diagram mainly showing the electrical construction of the apparatus of FIG. 1.

It should be noted that the sheet storing section 15, the pickup rollers 52, the feeding conveyance path 53, the pair of registration rollers 54, and the sheet reversing section 16 construct a sheet conveying assembly 131 (see FIG. 4).

FIG. 4 is a block diagram mainly showing the electrical construction of the image forming apparatus 10. The image forming apparatus 10 is provided with a controller 100 for controlling the operation of the entire apparatus. A parallel interface (I/F) 181, a serial interface (I/F) 182 and a network interface (I/F) 210 are connected with the controller 100 in addition to the aforementioned scanner device 120, image processing section 160, image memory 140, recording assembly 130 and operation panel 190.

An external terminal unit (not shown) such as a personal computer can be connected with the image forming apparatus 10 through these interfaces 181, 182 and 210. Such a connection enables the image forming apparatus 10 to receive image data and data designating printing conditions transmitted from the external terminal unit (not shown) and to record images on recording sheets P based on the received image data. The network interface 210 enables the connection of a multitude of terminal units through a local area network (LAN) or the like. The network interface 210 also enables the communication of various data through the Internet by further connecting the LAN with the external Internet.

The controller 100 includes an unillustrated CPU (central processing unit) and a storage such as a RAM or a ROM (read-only memory) storing a program specifying the operation of the CPU. In other words, the controller 100 includes a computer, thereby functioning as a scanner controller 101 and a printer controller 103.

The scanner controller 101 is for controlling the operation of the respective components necessary for a scanning operation. More specifically, the scanner controller 101 realizes a series of operations from an operation of reading an image data from a document to an operation of saving the image data in the image memory 140 by mainly controlling the scanner device 120, the image processing section 160 and the image memory 140.

On the contrary, the printer controller 103 is for controlling the operation of the respective components necessary for a printing operation. More specifically, the printer controller 103 realizes the recording of an image on a recording sheet P by controlling the recording assembly 130 based on the image data read by the scanner device 120 and saved in the image memory 140. The printer controller 103 also realizes the recording of an image on a recording sheet P by causing an image data transmitted from the external terminal unit through the various interfaces 181, 182 and 210 to be temporarily saved in the image memory 140 and controlling the recording assembly 130 based on the saved image data. Out of these printer functions realized by the printer controller 103, the former constitutes a copier function and the printer controller 103 realizes a printer function as a part of the copier function by controlling the respective components of the apparatus in cooperation with the scanner controller 101.

The above program for realizing these functions by being read by the computer as the controller 100 may also be stored in an unillustrated nonvolatile and large-capacity external storage device such as an HDD (hard disk drive) and suitably transferred to a main storage device such as the above RAM for the execution by the CPU. It is also possible to supply the above program via a recording medium such as a ROM or a CD-ROM or via a transmission medium such as a network connected with the network interface 210. In the case of supplying the program via a ROM, the program can be executed by the CPU by loading the ROM storing this program in the controller 100. In the case of supplying the program via a CD-ROM, a CD-ROM reader may be connected, for example, with the parallel interface 181 and the program may be executed by the CPU by being transferred to a RAM or a HDD. Further, in the case of supplying the program via a transmission medium, the program received via the network interface 210 or the like can be executed by the CPU by being transferred to a RAM or a HDD.

The operation panel 190 is used by an operator (user) to input various instructions necessary for the operation of the image forming apparatus 10. The operation panel 190 includes an LCD (liquid crystal display), a display section 191 on which various operation messages necessary for the manipulation of the image forming apparatus 10 are displayed, and an operation key section 192 having a numeric pad and other keys used to input a copying instruction, a printing instruction, the number of copies to be printed for a document, the selection of simplex printing and duplex printing, the selection of color printing and black-and-white printing and the like. The printer controller 103 causes all the four units 13Y, 13M, 13C and 13K constructing the image forming section 132 to operate when color printing is selected, and causes only the unit 13K to operate when black-and-while printing is selected. The display section 191 is preferably provided with a touch-panel function to enable the operator to input necessary instructions by touching the touch panel by the finger. In this case, the touch panel corresponds to one embodiment of the operation key section 192.

Figure 5:
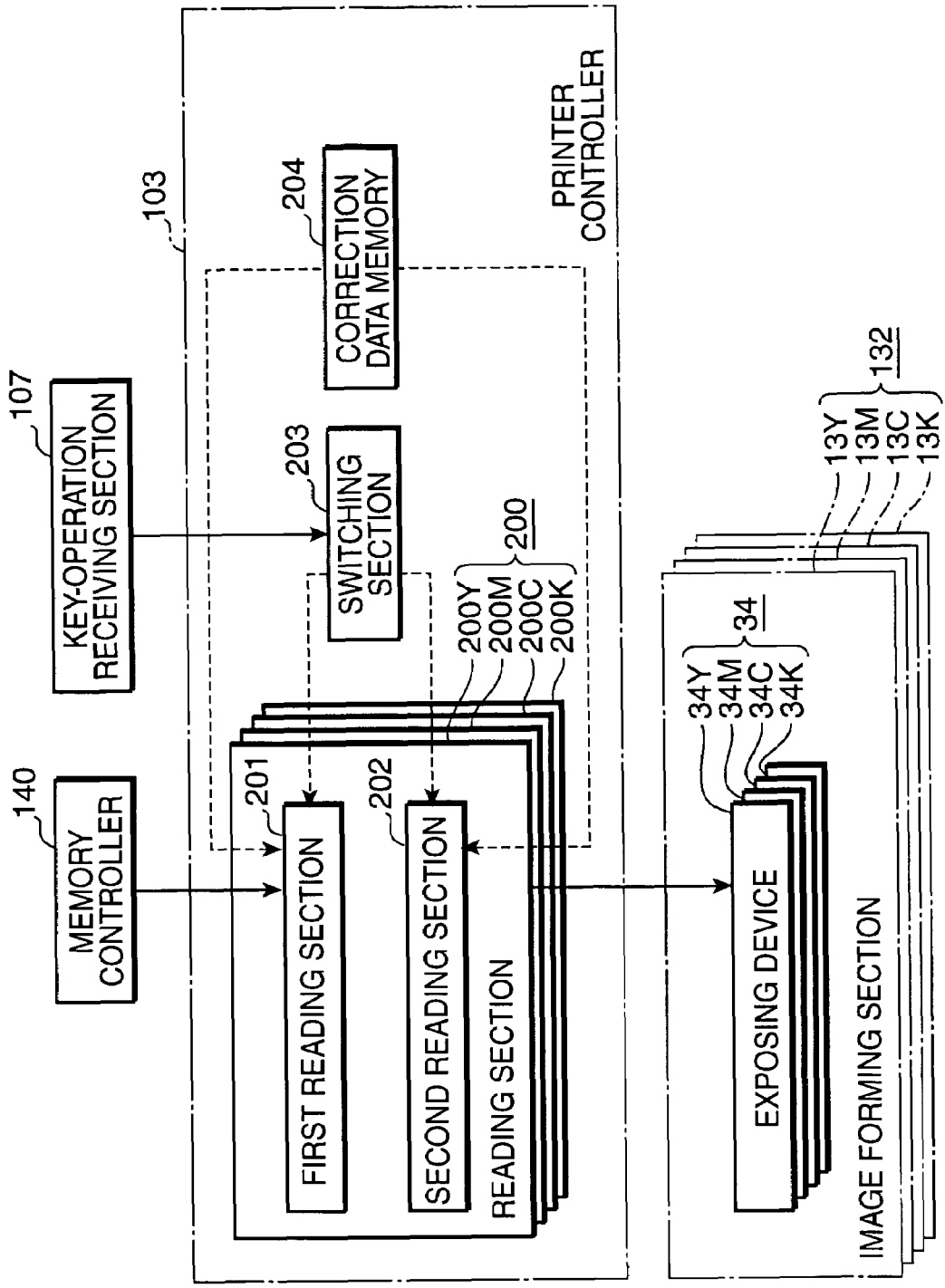
FIG. 5 is a functional block diagram showing the construction of a part of a printer controller of FIG. 4.

FIG. 5 is a functional block diagram showing a part of the printer controller 103 fulfilling a function of inputting an image data to the exposing device 34. This part corresponds to one embodiment of an exposed image input device according to the present invention. The printer controller 103 has a reading section 200, a switching section 203 and a correction data memory 204. The reading section 200 is for reading the image data saved in the image memory 140 and inputting it to the exposing device 34.

In addition to the LED array 81 and the like, the exposing device 34 has unillustrated line memory and digital-to-analog converter (D/A converter), and applies a digital image data of, e.g. one line inputted from the reading section 200 to the LED 81 of one line after latching the image data in the line memory and converting the latched image data into an analog image data. In this way, the respective LED devices of the LED array 81 generate and emit lights modulated to intensities indicated by the image data of the corresponding pixels.

The exposing device 34 may includes a line memory for a plurality of lines. In such a case, the exposing device 34 selects an image data of one line to be applied from the LED array 81 from the line memory in synchronism with the conveyance of the recording sheet P and applies the selected image data to the D/A converter. To this end, the printer controller 103 also inputs a synchronization signal, e.g. for selection switch to the exposing device 34.

There are four kinds of exposing devices 34Y, 34M, 34C, 34K corresponding to color components, and the reading section 200 includes four kinds of reading units 200Y, 200M, 200C, 200K in correspondence therewith. Each of the reading units 200Y, 200M, 200C, 200K has a first reading section 201 and a second reading section 202. The first reading section 201 inputs an image data of one page to the exposing device 34 while reading this image data pixel by pixel in a specified order from the image memory 140. On the other hand, the second reading section 202 inputs an image data of one page to the exposing device 34 while reading this image data pixel by pixel in an order opposite to the readout order of the first reading section 202 from the image memory 140.

The switching section 203 is for selectively causing one of the first and second reading sections 201, 202 to operate. Although not shown in FIG. 4, the controller 100 includes a key-operation receiving section 107 for receiving an input such as an instruction from the user through the operation of the operation key section 192. If the key-operation receiving section 107 receives a simplex printing instruction, the switching section 203 selects only the first reading section 201 out of the first and second reading sections 201, 202 and causes it to operate. On the other hand, if the key-operation receiving section 107 receives a duplex printing instruction, the switching section 203 alternatively selects the first and second reading sections 201, 202 and causes the selected one to operate every time the image data of one page is read from the image memory 140.

In FIG. 5, the first and second reading sections 201, 202 are shown such that two kinds of reading sections prepared in advanced are provided even without partly overlapping. However, the first and second reading sections 201, 202 may be completely separate from each other as shown in FIG. 5 or may partly overlap. Further, the first and second reading sections 201, 202 may be such that the same reading section 200 is caused to selectively function as either one of the first and second reading sections 201, 202 by the switching section 203.

The correction data memory 204 is a memory for storing deviation amounts of the pixels in the sub-scanning direction for the pixels arrayed along the main scanning direction or for each block comprised of a plurality of pixels. The correction data memory 204 preferably includes a RAM or a writing ROM (e.g. EEPROM (electrically erasable programmable ROM) such as a flash ROM) to enable a stored correction data to be changed.

The first reading section 201 reads the image data pixel by pixel along the main scanning direction while shifting the position of each pixel to be read in the sub-scanning direction by the deviation amount stored in the correction data memory 204 by referring to the correction data saved in the correction data memory 204.

The second reading section 202 is for reading the image data in the order opposite to the readout order by the first reading section 201. The second reading section 202 reads the image data saved in the image memory 140 pixel by pixel along the main scanning direction from a side opposite to the one at the time of reading by the first reading section 201 while reversing the negative and positive signs of the deviation amounts specified by the correction data saved in the correction data memory 204 and successively shifting the positions of the pixels to be read in the sub-scanning direction opposite to the one at the time of reading by the first reading section 201.

Figure 6A:
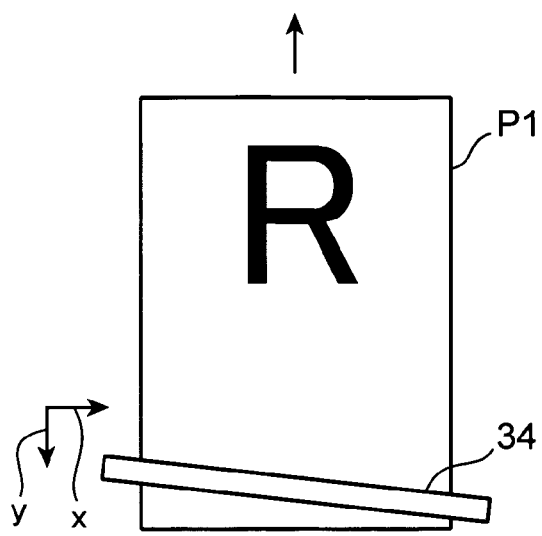
FIGS. 6A and 6B are diagrams showing a simplified relationship of a recording sheet, a moving direction thereof and the exposing device.
Figure 6B:
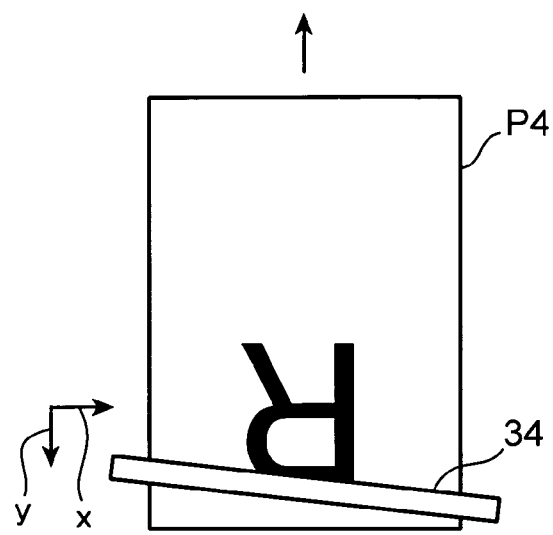

With reference to FIGS. 6 and 7, more specific exemplary operations of the first and second reading sections 201, 202 are described below. FIG. 6 are diagrams showing a simplified relationship of the recording sheet P, a moving direction thereof and the exposing direction 34 when a large character "R" is recorded on the front side of the recording sheet P (FIG. 6A) and an identically shaped character "R" is recorded on the rear side (FIG. 6B). An example in which the principal axis of the exposing device 34 is deviated from the main scanning direction x, particularly the principal axis is oblique to the main scanning direction x while maintaining its linearity is shown in an exaggerated manner in FIG. 6. It should be noted the deviations of the respective LED devices of the exposing device 34 indirectly reflect the positional relationship between the photoconductive drum 31 and the respective LED devices facing the photoconductive drum 31 as deviations from the main scanning direction x on the recording sheet P. However, a deviation indirectly appearing on the recording sheet P via the photoconductive drum 31 is directly shown as a deviation of the exposing device 34 on the recording sheet P in FIG. 6 for simplicity.

As shown in FIG. 6A, the recording sheet P1 to have the front side thereof printed is conveyed with the leading end thereof facing forward. On the contrary, the recording sheet P4 to have the rear side thereof printed is conveyed with the training end facing forward as shown in FIG. 6B. In other words, the recording sheet P having the front side thereof printed has the rear side thereof printed after being turned upside down and horizontally turned by 180°. Accordingly, when printing is applied to the rear side, the relationships of the same character "R" with the main scanning direction x and the sub-scanning direction y are both opposite to those when printing is applied to the front side.

Figure 7A:
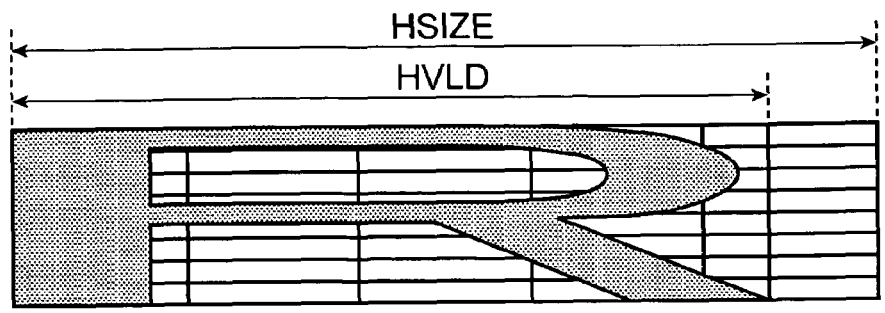
FIGS. 7A to 7C are diagrams showing a process of reading an image data from an image memory.

FIG. 7 are diagrams showing a process of reading an image data from the image memory 140. As shown in FIG. 7A, it is assumed that an image data representing a character "R" is stored in the image memory 140. For easier understanding, an address space of the image memory 140 is shown in FIG. 7A as if it were two-dimensionally developed into a shape similar to the image data developed along the main scanning direction x and the sub-scanning direction y. In FIG. 7A, HSIZE and HVLD denote the width of the address space of the two-dimensionally represented image memory 140 along the main scanning direction x and the effective width of the image data along the main scanning direction x. The effective width HVLD generally differs depending on the image data. Further, a deviation amount of each LED device of the exposing device 34 from a reference position in the sub-scanning direction y is expressed by a function f(x). Here, a variable x expresses a position along the main scanning direction x by the number of the pixels from the reference position. A value of the function f(x) is expressed by the number of the pixels along the sub-scanning direction y. As an example, a deviation toward the positive side along the main scanning direction x is expressed by a positive number and a deviation toward the opposite side is expressed by a negative number.

In the example of FIG. 7, the address space width HSIZE is equally divided into a plurality of areas are represented by blocks A1 to AN. Such blocks correspond to areas obtained by dividing image data at intervals of a plurality of pixels along the main scanning direction x. It is assumed that the correction data to be stored in the correction data memory 204 is given by a function A[m] of a block number m (=1, 2, . . . , N). Then, the function A[m] is given:

$$A[m]=f(xm) \quad \text{Equation (1)}$$

Here, it is assumed that a variable xm is, for example, given:

$$xm=(1/N) \times HSIZE \times (m-1) \quad \text{Equation (2).}$$

In the example of FIG. 7, a total block number is N=5, and the function A[m] as the correction data is expressed by A[m]=m−1.

Figure 7B:
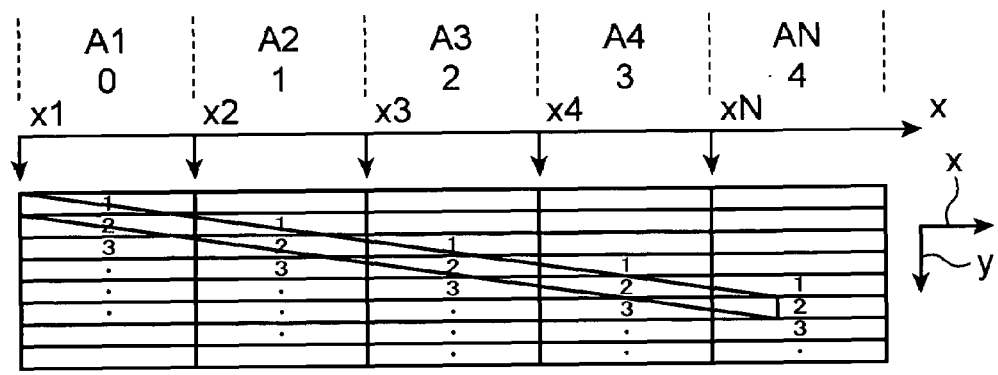

As shown in FIG. 7B, in the case of printing on the front side, the first reading section 201 first reads the image data of the first line pixel by pixel along the main scanning direction x. "1" is affixed to the image data of the first line to be read. Upon reading the image data of the first line, the first reading section 201 reads the image data on the line shifted by the function A[m] in the sub-scanning direction y for the pixels belonging to the m-th block by referring to the correction data. The first reading section 201 can judge the block number m from the addresses of the image data to be read, and reads the corresponding function A[m] from the correction data memory 204 and refers to it. The first reading section 201 successively inputs the read image data to the line memory of the exposing device 34 every time reading the image data of one pixel.

Upon completing the readout of the image data of the first line, the first reading section 201 reads the image data of the second line shifted by one line in the sub-scanning direction y. At this time, similar to the readout of the image data of the first line, the first reading section 201 reads the image data on the line shifted by the function A[m] in the sub-scanning direction y for the pixels belonging to the m-th block by referring to the correction data. "2" is affixed to the image data of the second line to be read. Thereafter, in a similar manner, the image data of the third and succeeding lines are read and successively inputted pixel to pixel to the line memory of the exposing device 34.

Figure 7C:
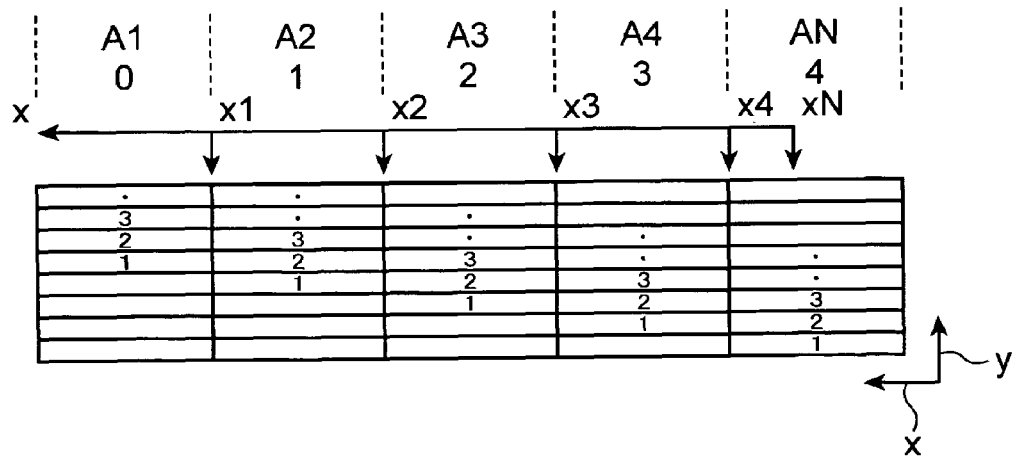

As shown in FIG. 7C, in the case of printing on the rear side, both the main scanning direction x and the sub-scanning direction y are reversed with respect to the image data, i.e. opposite to those in the case of printing on the front side shown in FIG. 7B. Thus, the second reading section 202 reads the image data in the (aforementioned) order opposite to the readout order by the first reading section 201. Specifically, the second reading section 202 reads the image data pixel by pixel along the main scanning direction x shown in FIG. 7C while referring to the function A[m] as the correction data. In other words, the second reading section 202 reads the image data on the line shifted by the function A[m] in the sub-scanning direction y shown in FIG. 7C for the pixels belonging to the m-th block by referring to the correction data. Similar to the first reading section 201, the second reading section 202 can judge the block number m from the addresses of the image data to be read, and reads the corresponding function A[m] from the correction data memory 204 and refers to it. The second reading section 202 successively inputs the read image data to the line memory of the exposing device 34 every time reading the image data of one pixel. As shown by "1", "2", "3", . . . in FIG. 7C, the second reading section 202 successively shifts the lines to be read along the sub-scanning direction y.

Since the image forming apparatus 10 operates as described above, duplex printing can be achieved without saving the image data in the image memory 140 by reversing it for printing on the rear side. Further, since the image data is read pixel by pixel at positions shifted from the main scanning direction x based on the correction data saved in the correction data memory 204, even if an exposure line by the exposing device 34 is deviated due to an installation error or the like, proper printing can be achieved by correcting this deviation for both printing on the front side and printing on the rear side.

Further, it is sufficient to prepare the function A[m] as the correction data for specifying the deviation amount for each block m since the positions of the pixels to be read are shifted stepwise in the sub-scanning direction for each block comprised of a plurality of pixels in the main scanning direction x in the image forming apparatus 10. In other words, the correction data to be stored in the correction data memory 204 can be simplified.

The deviation amount f(x) of the exposure line by the exposing direction 34 to be corrected may be a deviation from the conveying direction of the recording sheet P, i.e. a deviation from the main scanning direction x, but may also be relative deviations among the four types of exposure devices 34Y, 34M, 34C, 34K corresponding to the respective colors in the case of color printing. This is because deviations from the conveying direction of the recording sheet P do not visually stand out, whereas relative deviations among the exposure devices 34Y, 34M, 34C, 34K visually stand out more as color drifts.

The correction data may be stored in the correction data memory 204 based on measurement values of the deviation amounts of the exposing device 34 before the factory shipment of the image forming apparatus 10. Together with or instead of this, the correction data may be inputted to the correction data memory 204 at a suitable timing by a maintenance service person or a user himself after the image forming apparatus 10 becomes available to the user. To this end, the image forming apparatus 10 may be constructed such that color drifts are detected, a test chart for finding out a correction data to solve the color drifts is prepared, the correction data is detected by copying or printing this test chart, and this correction data is renewably stored in the correction data memory 204 through the operation of the operation key section 192. By adopting such a mode, changes in the deviation amounts of the exposing devices 34 with time can also be dealt with.

Further, the image data the reading section 200 reads from the image memory 140 may be a binary image converted by an error diffusion method or the like or may be a multilevel image having many gradations such as 256 gradations. Which of these image data is to be read depends on which type the image forming section 132 is.

In the foregoing embodiment, the first and second reading sections 201, 202 are so constructed as to refer to the correction data for giving the deviation amounts upon the readout, i.e. the correction values, for the respective blocks each comprised of a plurality of pixels in the main scanning direction x. On the contrary, the first and second reading sections 201, 202 may be so constructed as to refer to the correction data for giving the correction values for the respective pixels in the main scanning direction x. This can lead to a finer correction.

In the foregoing embodiment, the reading section 200 and the switching section 203 as components of the exposed image input device are realized by the computer installed with software as part of the controller 100. On the contrary, the exposed image input device may be separate from the controller 100 and may construct part of a print head as an apparatus component for driving the exposing device 34. In such a case, the reading section 200 and the switching section 203 may be constructed only by hardware such as an integrated circuit requiring no software. It is also possible to include the line memory and the D/A converter as part of the exposing device 34 according to the foregoing embodiment in the print head as parts separate from the exposing device 34.

In the foregoing embodiment, the LED array 81 is used in the exposing device 34. On the contrary, a laser scanner or another type of exposing device may also be used as the exposing device.

In general, the routines executed to implement the embodiment of the invention, whether implemented as part of an operating system or a specific application, component, program, object, module or sequence of instructions will be referred to as "programs". The program comprises one or more instructions that are resident at various times in various memories and storage devices in a computer, and that cause the computer to perform the steps necessary to execute steps or elements embodying the various aspects of the invention.

The embodiment of the invention has been and will be described in the context of functioning the computer and computer system. However, those skilled in the art will appreciate that various embodiments of the invention are capable of being distributed as a program product in a variety of forms, and that the invention is applied equally regardless of the particular type of signal bearing media used to actually carry out the distribution. Examples of signal bearing media include but are not limited to recordable type media such as volatile and non-volatile memory devices, floppy and other removable disks, hard disk drives, optical disks (e.g., CD-ROM's, DVD's, etc.), among others, and transmission type media such as digital and analog communication links, including the Internet.

In short, the present invention is directed to An exposed image input device for reading an image data saved in an image memory and inputting the read image data to an exposing device, comprising: a correction data memory for storing a correction data specifying a deviation amount of the image data in a sub-scanning direction for each position along a main scanning direction; a first reading section for inputting an image data of one page to the exposing device while reading the image data pixel by pixel in a specified order from the image memory by referring to the correction data; a second reading section for inputting an image data of one page to the exposing device while reading the image data pixel by pixel in an order opposite to the specified order from the image memory by referring to the correction data; and a switching section for alternately switching the first and second reading sections to operate and alternately causing the first and second reading sections to read the image data of one page every time the image data of one page saved in the image memory is read, the specified order being an order in which the image data is read along the main scanning direction while shifting the positions of pixels to be read in the sub-scanning direction pixel by pixel by the deviation amounts specified by the correction data and the readout along the main scanning direction is repeated while successively moving the readout positions in the sub-scanning direction.

In the above exposed image input device, a data specifying a deviation in the sub-scanning direction for each pixel along the main scanning direction of the image data is further stored in the correction data memory, and the first and second reading sections respectively read the image data from the image memory by referring to the correction data stored in the correction data memory and specified for the respective pixels along the main scanning direction.

In the above exposed image input device, the deviation amounts in the sub-scanning direction at the respective positions of the image data specified along the main scanning direction and indicated by the correction data stored in the correction data memory are expressed by a function.

According to these devices, an operation of reading the image data saved in the image memory pixel by pixel in the specified order and inputting it to the exposing device and an operation of reading the image data saved in the image memory pixel by pixel in the order opposite to the specified order and inputting it to the exposing device are alternately switched every time the image data of one page is read. Thus, by applying these devices to a printer capable of performing duplex printing by turning a recording sheet by 180° between printing on front side and printing on the rear side, duplex printing can be achieved without saving the image data for printing on the rear side in the image memory by reversing it. Further, since the image data is read pixel by pixel while the readout positions are shifted with respect to the main scanning direction based on the correction data stored in the correction data memory, even if there is a deviation of the exposure line by the exposing device due to an installation error or the like, proper printing can be achieved by correcting this deviation for both printing on the front side and printing on the rear side.

In the above exposed image input device, a data specifying a deviation in the sub-scanning direction for each block comprised of a plurality of pixels along the main scanning direction of the image data is further stored in the correction data memory; and the first and second reading sections respectively read the image data from the image memory by referring to the correction data stored in the correction data memory and specified for the each block along the main scanning direction.

According to this device, the first and second reading sections reads the image data while referring to the correction data specifying the deviation amount from the main scanning direction for each block comprised of a plurality of pixels along the main scanning direction. Thus, it is sufficient to prepare the data specifying the deviation amount for each block. In other words, the correction data to be stored in the correction data memory can be simplified.

The present invention also concerns a printer apparatus comprising the inventive exposed image input device, the image memory and the exposing device.

Since comprising the image memory, the inventive exposed image input device for reading an image data saved in the image memory and inputting it to the exposing device, and the exposing device, such a printer apparatus can perform duplex printing while correcting a deviation of an exposure line by the exposing device without saving an image data for printing on the rear side in the image memory by reversing it. It should be noted that the printer apparatus according to the present invention embraces not only an exclusive printer for receiving an image data and printing it on a recording sheet, but also an image forming apparatus in general having a printer function such as a copier or a facsimile machine.

The present invention further concerns a tandem color printer apparatus comprising exposing devices corresponding to the respective colors used for color printing, the image memory, and the inventive exposed image input device for each of the exposing devices corresponding to the respective colors.

Since the printer apparatus is a tandem color printer and the inventive exposed image input device is provided for each of a plurality of exposing devices corresponding to a plurality of colors, even if there are relative deviations in the directions of exposure lines among the plurality of exposing devices, proper printing can be achieved by correcting these deviations for both printing on the front side and printing on the rear side. In other words, duplex printing can be realized by suppressing or solving color drifts resulting from the deviations of the exposure lines.

The present invention furthermore concerns an image data input control program product for causing an image data saved in an image memory to read and the read image data to be inputted to an exposing device, the program causing a computer to function as: a first reading section for inputting an image data of one page to the exposing device while reading the image data pixel by pixel in a specified order from the image memory by referring to a correction data specifying a deviation of the image data in a sub-scanning direction for each position along a main scanning direction; a second reading section for inputting an image data of one page to the exposing device while reading the image data pixel by pixel in an order opposite to the specified order from the image memory by referring to the correction data; and a switching section for alternately switching the first and second reading sections to operate and alternately causing the first and second reading sections to read the image data of one page every time the image data of one page saved in the image memory is read, the specified order being an order in which the image data is read along the main scanning direction while shifting the positions of pixels to be read in the sub-scanning direction pixel by pixel by the deviation amounts specified by the correction data and the readout along the main scanning direction is repeated while successively moving the readout positions in the sub-scanning direction; and a signal bearing media bearing the program.

In the above image data input control program product, the correction data is a data specifying a deviation amount in the sub-scanning direction for each pixel along the main scanning direction of the image data, and the computer is caused to function such that the first and second reading sections respectively read the image data from the image memory by referring to the correction data stored in the correction data memory and specified for each pixel along the main scanning direction.

In the above image data input control program product, the correction data is a data specifying a deviation amount in the sub-scanning direction for each block comprised of a plurality of pixels along the main scanning direction of the image data, and the computer is caused to function such that the first and second reading sections respectively read the image data from the image memory by referring to the data stored in the correction data memory and specified for the each block along the main scanning direction.

In the above image data input control program product, the deviation amounts in the sub-scanning direction at the respective positions of the image data specified along the main scanning direction and indicated by the correction data stored in the correction data memory are expressed by a function.

This application is based on patent application No. 2005-331461 filed on Nov. 16, 2005 in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An exposed image input device for reading an image data saved in an image memory and inputting the read image data to an exposing device, comprising:
 a correction data memory for storing a correction data specifying a deviation amount of the image data in a sub-scanning direction for each position along a main scanning direction;
 a first reading section for inputting an image data of one page to the exposing device while reading the image data pixel by pixel in a specified order from the image memory by referring to the correction data;
 a second reading section for inputting an image data of one page to the exposing device while reading the image data pixel by pixel in an order opposite to the specified order from the image memory by referring to the correction data; and
 a switching section for alternately switching the first and second reading sections to operate and alternately causing the first and second reading sections to read the image data of one page every time the image data of one page saved in the image memory is read, the specified order being an order in which the image data is read along the main scanning direction while shifting the positions of pixels to be read in the sub-scanning direction pixel by pixel by the deviation amounts specified by the correction data and the readout along the main scanning direction is repeated while successively moving the readout positions in the sub-scanning direction.

2. An exposed image input device according to claim 1, wherein:

a data specifying a deviation in the sub-scanning direction for each pixel along the main scanning direction of the image data is further stored in the correction data memory; and the first and second reading sections respectively read the image data from the image memory by referring to the correction data stored in the correction data memory and specified for the respective pixels along the main scanning direction.

3. An exposed image input device according to claim 1, wherein:

a data specifying a deviation in the sub-scanning direction for each block comprised of a plurality of pixels along the main scanning direction of the image data is further stored in the correction data memory; and the first and second reading sections respectively read the image data from the image memory by referring to the correction data stored in the correction data memory and specified for the each block along the main scanning direction.

4. An exposed image input device according to claim 1, wherein:

the deviation amounts in the sub-scanning direction at the respective positions of the image data specified along the main scanning direction and indicated by the correction data stored in the correction data memory are expressed by a function.

5. A printer apparatus, comprising the exposed image input device according to claim 1, the image memory and the exposing device.

6. A tandem printer apparatus, comprising exposing devices corresponding to the respective colors used for color printing, the image memory, the exposed image input device according to claim 1 for each of the exposing devices corresponding to the respective colors.

7. An image data input control program product for causing an image data saved in an image memory to read and the read image data to be inputted to an exposing device, the program causing a computer to function as:

a first reading section for inputting an image data of one page to the exposing device while reading the image data pixel by pixel in a specified order from the image memory by referring to a correction data specifying a deviation of the image data in a sub-scanning direction for each position along a main scanning direction;

a second reading section for inputting an image data of one page to the exposing device while reading the image data pixel by pixel in an order opposite to the specified order from the image memory by referring to the correction data; and a switching section for alternately switching the first and second reading sections to operate and alternately causing the first and second reading sections to read the image data of one page every time the image data of one page saved in the image memory is read, the specified order being an order in which the image data is read along the main scanning direction while shifting the positions of pixels to be read in the sub-scanning direction pixel by pixel by the deviation amounts specified by the correction data and the readout along the main scanning direction is repeated while successively moving the readout positions in the sub-scanning direction; and a signal bearing media bearing the program.

8. An image data input control program product according to claim 7, wherein:

a data specifying a deviation in the sub-scanning direction for each pixel along the main scanning direction of the image data is further stored in the correction data memory; and the first and second reading sections respectively read the image data from the image memory by referring to the correction data stored in the correction data memory and specified for the respective pixels along the main scanning direction.

9. An image data input control program product according to claim 7, wherein:

a data specifying a deviation in the sub-scanning direction for each block comprised of a plurality of pixels along the main scanning direction of the image data is further stored in the correction data memory; and the first and second reading sections respectively read the image data from the image memory by referring to the correction data stored in the correction data memory and specified for the each block along the main scanning direction.

10. An image data input control program product according to claim 7, wherein:

the deviation amounts in the sub-scanning direction at the respective positions of the image data specified along the main scanning direction and indicated by the correction data stored in the correction data memory are expressed by a function.

* * * * *